(12) United States Patent
Yin

(10) Patent No.: US 12,085,173 B2
(45) Date of Patent: Sep. 10, 2024

(54) WATERPROOF AND DUSTPROOF ELECTRIC PUSH ROD

(71) Applicant: TOMUU ACTUATOR TECHNOLOGY CO. LTD, Dongguan (CN)

(72) Inventor: Liang Yin, Xiangtan (CN)

(73) Assignee: TOMUU ACTUATOR TECHNOLOGY CO. LTD, Dongguan (CN)

( * ) Notice: Subject to any disclaimer, the term of this patent is extended or adjusted under 35 U.S.C. 154(b) by 147 days.

(21) Appl. No.: 17/895,480

(22) Filed: Aug. 25, 2022

(65) Prior Publication Data
US 2022/0403938 A1    Dec. 22, 2022

(30) Foreign Application Priority Data

Jun. 20, 2022   (CN) .......................... 202210698524.7

(51) Int. Cl.
*F16H 25/24* (2006.01)
*F16H 57/04* (2010.01)
*F16J 15/56* (2006.01)

(52) U.S. Cl.
CPC .......... *F16J 15/56* (2013.01); *F16H 25/2418* (2013.01); *F16H 57/0497* (2013.01)

(58) Field of Classification Search
CPC .............. F16J 15/56; F16H 2025/2034; F16H 2025/204; F16H 25/24; F16H 25/2418; F16H 57/0497; F16H 2025/2481; F16H 25/2006
See application file for complete search history.

(56) References Cited

U.S. PATENT DOCUMENTS

| | | | | |
|---|---|---|---|---|
| 10,100,908 | B2 * | 10/2018 | Ohno | .................... F16B 7/0426 |
| 2015/0330497 | A1 * | 11/2015 | Amano | ............... F16H 57/0497 |
| | | | | 74/89.41 |
| 2022/0003298 | A1 * | 1/2022 | Yamamoto | .......... F16H 25/2214 |

FOREIGN PATENT DOCUMENTS

| | | |
|---|---|---|
| CN | 210092514 U | 2/2020 |
| CN | 213072333 U | 4/2021 |
| CN | 214626716 U | 11/2021 |

* cited by examiner

*Primary Examiner* — Gregory Robert Weber
(74) *Attorney, Agent, or Firm* — Jeenam Park

(57) ABSTRACT

The present invention relates to the field of push rods, in particular to a waterproof and dustproof electric push rod, where a waterproof and dustproof module includes a single-lip oil seal, a first anti-swing ring, a piston oil seal and a second anti-swing ring, which are arranged in sequence in a retraction direction of an inner tube. When the inner tube retracts, since inner rings of the single-lip oil seal, the first anti-swing ring, the piston oil seal and the second anti-swing ring are tightly attached to an outer sidewall of the inner tube, the single-lip oil seal plays a role in scraping off dirt (dust, silts, etc.) on the surface of the inner tube, and the internal piston oil seal can be waterproof and dustproof.

6 Claims, 12 Drawing Sheets

WATERPROOF AND DUSTPROOF ELECTRIC PUSH ROD

CROSS-REFERENCE TO RELATED APPLICATIONS

The application claims priority to Chinese patent application No. 2022106985247, filed on Jun. 20, 2022, the entire contents of which are incorporated herein by reference.

TECHNICAL FIELD

The present invention relates to the field of push rods, in particular to a waterproof and dustproof electric push rod.

BACKGROUND

An electric push rod is an electric drive device, which converts a rotational motion of a motor into a linear reciprocating motion of a push rod. Electric push rods can be used as executive machines in various simple or complex technological processes to achieve remote control, centralized control or automatic control, and are mostly used in motion drive units in household appliances, kitchenware, medical apparatus, automobiles and other industries.

No corresponding waterproof or dustproof structure is provided in the existing electric push rod. Due to changeable use environments of an electric push rod, an outer wall of the push rod exposed in the outdoor environment will be inevitably stained with a certain amount of sediment/water vapor/dust. When a motor drives the push rod to retract, the sediment/water vapor/dust on the outer wall of the push rod will directly enter the inside of the push rod, which will cause water vapor to corrode an internal structure or an internal circuit on a regular basis, and at the same time, is easy to cause rust and other conditions that affect normal work.

Therefore, the inventor is committed to designing a waterproof and dustproof electric push rod to solve the above-mentioned problems.

SUMMARY

In order to solve the above-mentioned problems, the present invention provides a waterproof and dustproof electric push rod, which is provided with a single-lip oil seal, a first anti-swing ring, a piston oil seal and a second anti-swing ring, where inner rings of the single-lip oil seal, the first anti-swing ring, the piston oil seal and the second anti-swing ring are tightly attached to an outer sidewall of an inner tube. When the inner tube retracts, since the inner rings of the single-lip oil seal, the first anti-swing ring, the piston oil seal and the second anti-swing ring are tightly attached to the outer sidewall of the inner tube, the single-lip oil seal plays a role in scraping off dirt (dust, silts, etc.) on the surface of the inner tube, and the internal piston oil seal can be waterproof and dustproof.

In order to achieve the above-mentioned object, the technical scheme adopted in the present invention is: disclosed is a waterproof and dustproof electric push rod, including a driving module, an outer tube assembly, an inner tube, a lead screw and a sliding nut, where both the lead screw and the inner tube are located inside the outer tube assembly, the sliding nut is movably fitted on the lead screw, the driving module is connected to the lead screw in a driving manner, and the inner tube is sleeved on a limit nut and extends to the outside of the outer tube assembly or retracts into the outer tube assembly in a length direction of the lead screw; a waterproof and dustproof module is clamped between the inner tube and the outer tube assembly, where the waterproof and dustproof module includes a single-lip oil seal, a first anti-swing ring, a piston oil seal and a second anti-swing ring, which are arranged in sequence in a retraction direction of the inner tube, and inner rings of the single-lip oil seal, the first anti-swing ring, the piston oil seal and the second anti-swing ring are tightly attached to an outer sidewall of the inner tube.

Further, inner sidewalls of the first anti-swing ring and the second anti-swing ring are provided with a plurality of turns of threaded oil storage tanks, and an oil storage chamber is formed between the threaded oil storage tanks and the outer sidewall of the inner tube.

Further, the outer tube assembly includes an outer tube body and a fixed end cap, where a front end of the outer tube body is provided with an opening, the opening is closed by the fixed end cap, and an outlet for the inner tube to pass through is arranged at the center of the fixed end cap.

Further, an inner wall of the outer tube body is protruded with a plurality of sliding teeth at intervals; the sliding nut includes a sliding contact assembly and a sliding sleeve, where an inner wall of the sliding contact assembly is provided with internal threads, one end of the sliding contact assembly is provided with external threads, the sliding sleeve is sleeved at the other end of the sliding contact assembly, an outer wall of the sliding sleeve is provided with a plurality of chutes, each of the chutes is arranged in an axial direction of the sliding sleeve, and the plurality of sliding teeth of the outer tube are matched with the plurality of chutes on the sliding sleeve in one-to-one correspondence.

Further, an oil seal fitting slot is provided at the back of the fixed end cap at a position corresponding to the outlet, where the single-lip oil seal is sealed and fitted in the oil seal fitting slot by means of a sealing ring, and a surface of the oil seal fitting slot is covered with a sealing cover.

Further, the sliding teeth of the outer tube body are tightly attached to outer rings of the first anti-swing ring, the piston oil seal and the second anti-swing ring.

Further, the sliding contact assembly includes a slider and a threaded sleeve, where both the slider and the sliding sleeve are annular, the internal threads are arranged on an inner wall of the threaded sleeve, the slider is sleeved outside the threaded sleeve, the slider and the threaded sleeve are positioned by means of two positioning screws, the two positioning screws are arranged between the slider and the threaded sleeve in the axial direction, one part of the same positioning screw is located on an inner wall slot of the slider, the other part of the positioning screw is located on an outer wall slot of the threaded sleeve, and the two positioning screws are located on end faces of both the slider and the threaded sleeve and are arranged opposite to each other.

Further, the external threads are located on an outer wall of the slider, a plurality of side slots, a plurality of grooves and an annular limit table are arranged on an outer wall of one end of the slider away from its external threads, the plurality of side slots extend in an axial direction of the slider, the plurality of grooves extend in a circumferential direction of the slider, the plurality of side slots are in cross communication with the plurality of grooves, and the limit table is located between the plurality of grooves and the external threads.

Further, the inner wall of the sliding sleeve is matched with the outer wall of the slider in a rotational limit manner, the outer wall of the sliding sleeve is extended outwardly with a limit portion, an end face of the sliding sleeve is provided with a plurality of material digging holes, and when the sliding sleeve is sleeved on the slider, the external threads on the slider and the limit table are located outside the sliding sleeve.

Further, the inner wall of the outer tube body is also provided with two hanging slots and a positioning portion, the plurality of sliding teeth, the two hanging slots and the positioning portion are all arranged in an axial direction of the outer tube body, a fixing frame is hung on the inner wall of the outer tube body in its axial direction, both ends of the fixing frame are provided with elongated hanging tables, respectively, the two hanging tables are matched with the two hanging slots of the outer tube body in one-to-one correspondence, respectively, one end of the fixing frame away from the outer tube body is provided with a positioning slot that is matched with the positioning portion of the outer tube body, both ends of the fixing frame are fixed with micro switches, respectively, the sliding sleeve 1 is located between the two micro switches, and the limit portion of the sliding sleeve is located on the side of the fixing frame.

The beneficial effects of the present invention lie in: 1. A driving module drives a lead screw to rotate, and the lead screw drives the entire sliding nut to slide back and forth in an outer tube to realize a telescopic action of an inner tube. Meanwhile, in the present application, a waterproof and dustproof module includes a single-lip oil seal, a first anti-swing ring, a piston oil seal and a second anti-swing ring, which are arranged in sequence in a retraction direction of the inner tube. When the inner tube retracts, since inner rings of the single-lip oil seal, the first anti-swing ring, the piston oil seal and the second anti-swing ring are tightly attached to an outer sidewall of the inner tube, the single-lip oil seal plays a role in scraping off dirt (dust, silts, etc.) on the surface of the inner tube, and the internal piston oil seal can be waterproof and dustproof.

2. In addition, inner sidewalls of the first anti-swing ring and the second anti-swing ring are provided with a plurality of turns of threaded oil storage tanks. Assuming that there is a single-lip oil seal in the front, dust needs to move up slowly in the direction of the threaded oil storage tanks to make uneasy entering. Applying grease in the threaded oil storage tanks during fitting can make the inner tube more lubricous, and the grease can be stored inside, so that both the first anti-swing ring and the second anti-swing ring play a lubricating role every time the inner tube extends or retracts.

3. The sliding teeth of the outer tube body are tightly attached to outer rings of the first anti-swing ring, the piston oil seal and the second anti-swing ring, a seat processing part is supported at a front end, and the first anti-swing ring and the second anti-swing ring have no die-casting draft angle, so that the first anti-swing ring and the second anti-swing ring are more compactly attached to the inner wall of the outer tube, the support force and concentricity are better, and the inner tube swings less.

Figure 1:
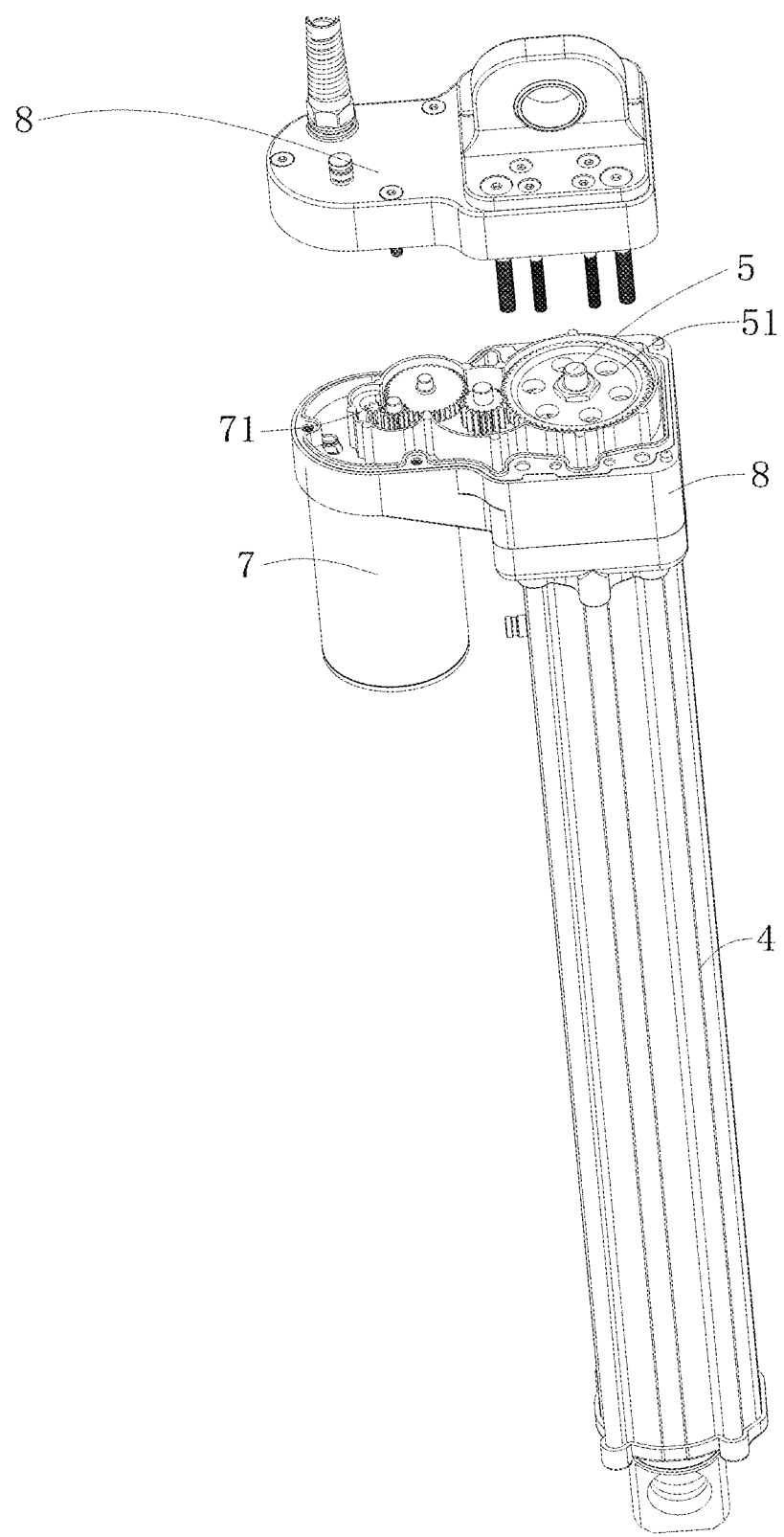
FIG. 1 is a three-dimensional exploded view of the electric push rod according to the present invention.
Figure 2:
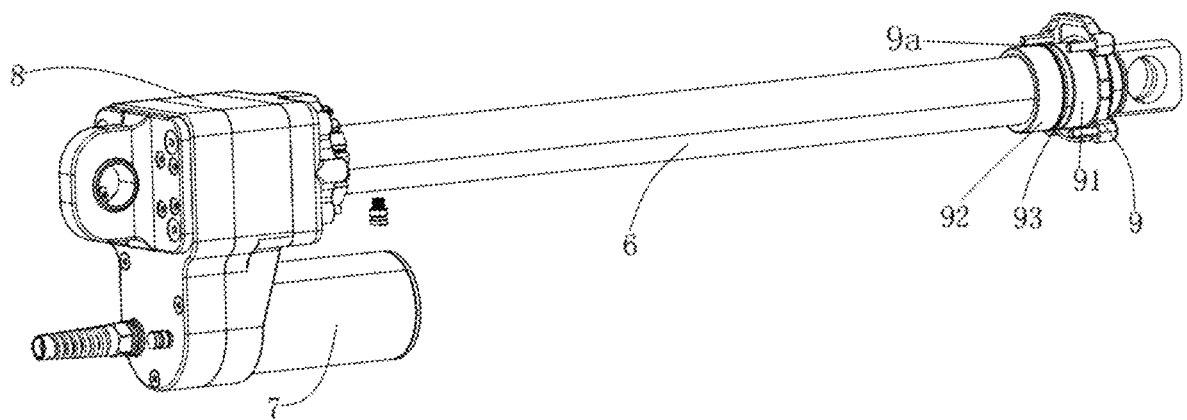
FIG. 2 is a schematic three-dimensional structural diagram of the electric push rod omitting the outer tube body and the fixing frame according to the present invention.
Figure 3:
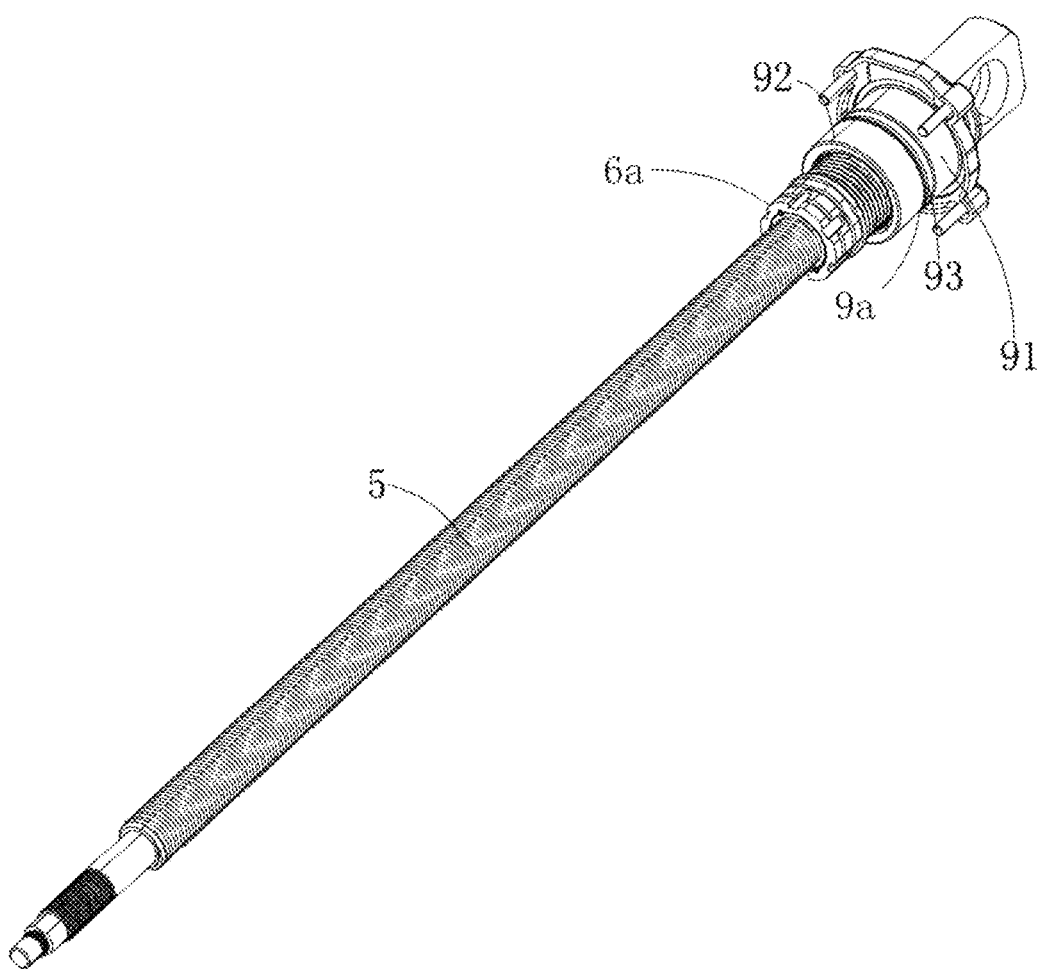
FIG. 3 is a schematic three-dimensional structure diagram omitting the inner tube and the driving module on the basis of FIG. 2.
Figure 4:
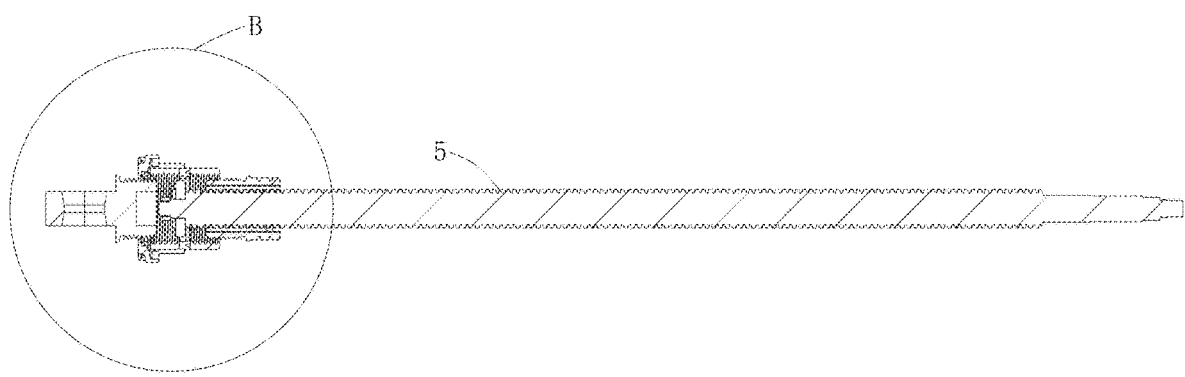
FIG. 4 is a cross-sectional view of FIG. 3.

Listing of reference numerals: Sliding Sleeve 1, Sliding Slot 11, Material Digging Hole 12, Limit Portion 13, Slider 2, Side Slot 21, Groove 22, Limit Table 23, Threaded Sleeve 3, Positioning Screw 31, Outer Tube Body 4, Fixing Frame 41, Hanging Table 411, Positioning Slot 412, Micro Switch 42, Sliding Tooth 43, Lead Screw 5, Driven Gear 51, Inner Tube 6, Limit Nut 6a, Motor 7, Driving Gear 71, Base 8, Fixed End Cap 9, Waterproof and Dustproof Module 9a, Single-lip Oil Seal 90, First Anti-swing Ring 91, Second Anti-swing Ring 92, Threaded Oil Storage Tank 920, Piston Oil Seal 93, Sealing Ring 95, Sealing Cover 95, and Oil Seal Fitting Slot 96.

DETAILED DESCRIPTION OF THE EMBODIMENTS

Referring to FIG. 1 to FIG. 12, the present invention relates to a waterproof and dustproof electric push rod, including a driving module, an outer tube assembly, an inner tube 6, a lead screw 5 and a sliding nut, where both the lead screw 5 and the inner tube 6 are located inside the outer tube assembly, the sliding nut is movably fitted on the lead screw 5, the driving module is connected to the lead screw 5 in a driving manner, and the inner tube 6 is sleeved on a limit nut 6a and extends to the outside of the outer tube assembly or retracts into the outer tube assembly in a length direction of the lead screw 5; a waterproof and dustproof module 9a is clamped between the inner tube 6 and the outer tube assembly, where the waterproof and dustproof module 9a includes a single-lip oil seal 90, a first anti-swing ring 91, a piston oil seal 93 and a second anti-swing ring 92, which are arranged in sequence in a retraction direction of the inner tube 6, and inner rings of the single-lip oil seal 90, the first anti-swing ring 91, the piston oil seal 93 and the second anti-swing ring 92 are tightly attached to an outer sidewall of the inner tube 6.

A driving module drives a lead screw 5 to rotate, and the lead screw 5 drives the entire sliding nut to slide back and forth in an outer tube to realize a telescopic action of an inner tube 6. Meanwhile, in the present application, a waterproof and dustproof module 9a includes a single-lip oil seal 90, a first anti-swing ring 91, a piston oil seal 93 and a second anti-swing ring 92, which are arranged in sequence in a retraction direction of the inner tube 6, and inner rings of the single-lip oil seal 90, the first anti-swing ring 91, the piston oil seal 93 and the second anti-swing ring 92 are tightly attached to an outer sidewall of the inner tube 6. When the inner tube 6 retracts, since the inner rings of the single-lip oil seal 90, the first anti-swing ring 91, the piston oil seal 93 and the second anti-swing ring 92 are tightly attached to the outer sidewall of the inner tube 6, the single-lip oil seal 90 plays a role in scraping off dirt (dust, silts, etc.) on the surface of the inner tube 6, and the internal piston oil seal 93 can be waterproof and dustproof.

It should be noted that the single-lip oil seal 90 and the piston oil seal 93 used in the present application are both products that can be directly purchased on the market, and therefore the specific structures thereof are no longer cumbersome to discuss.

Figure 5:
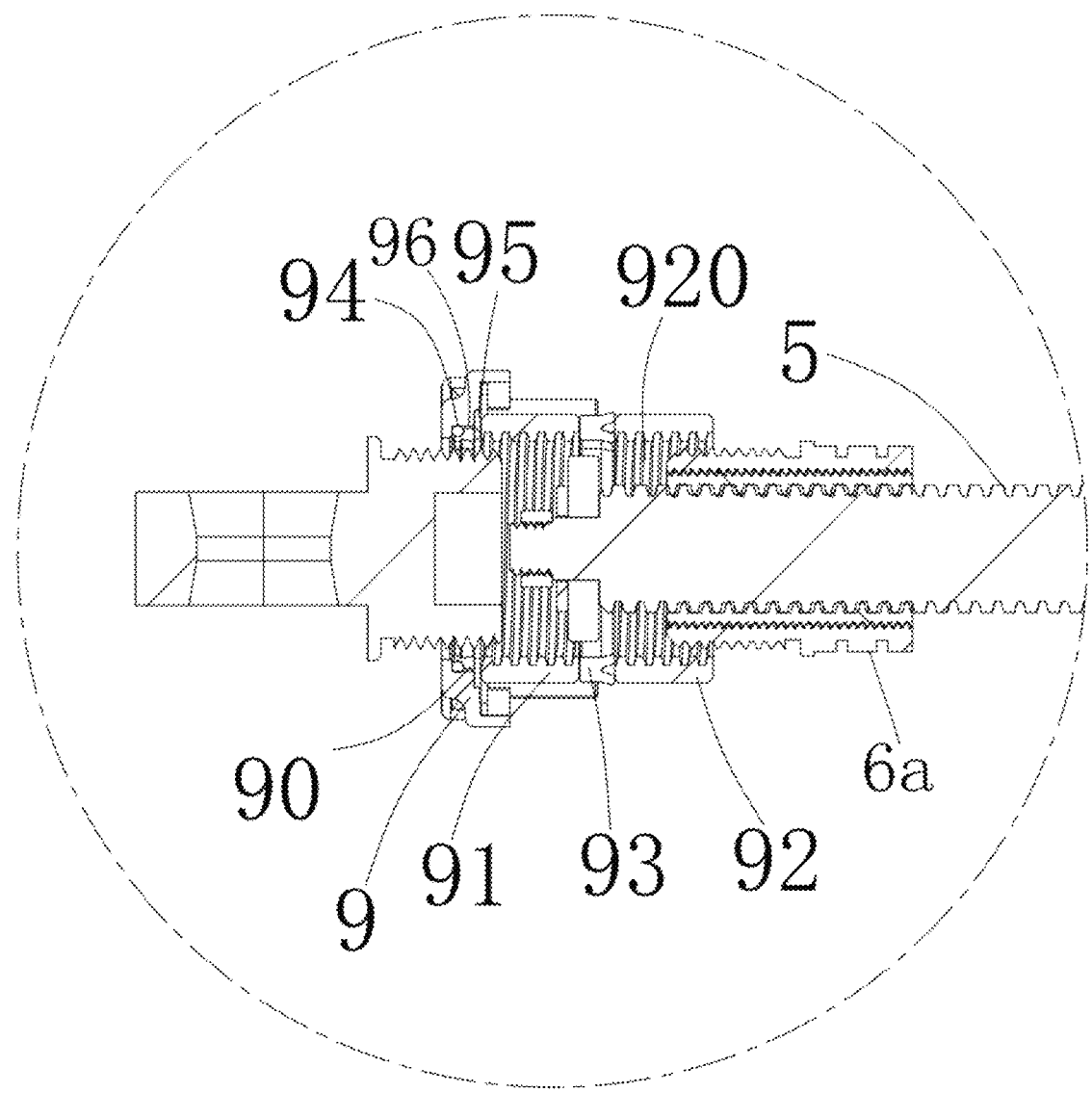
FIG. 5 is an enlarged view of B in FIG. 4.

Referring to FIG. 5, further, inner sidewalls of the first anti-swing ring 91 and the second anti-swing ring 92 are provided with a plurality of turns of threaded oil storage tanks 920, and an oil storage chamber is formed between the threaded oil storage tanks 920 and an outer sidewall of the inner tube 6.

In addition, inner sidewalls of the first anti-swing ring 91 and the second anti-swing ring 92 are provided with a plurality of turns of threaded oil storage tanks 920. Assuming that there is a single-lip oil seal 90 in the front, dust needs to move up slowly in the direction of the threaded oil storage tanks 920 to make uneasy entering. Applying grease in the threaded oil storage tanks 920 during fitting can make the inner tube 6 more lubricous, and the grease can be stored inside, so that both the first anti-swing ring 91 and the second anti-swing ring 92 play a lubricating role every time the inner tube 6 extends or retracts.

Further, the outer tube assembly includes an outer tube body 4 and a fixed end cap 9, where a front end of the outer tube body 4 is provided with an opening, the opening is closed by the fixed end cap 9, and an outlet for the inner tube 6 to pass through is arranged at the center of the fixed end cap 9.

Figure 12:
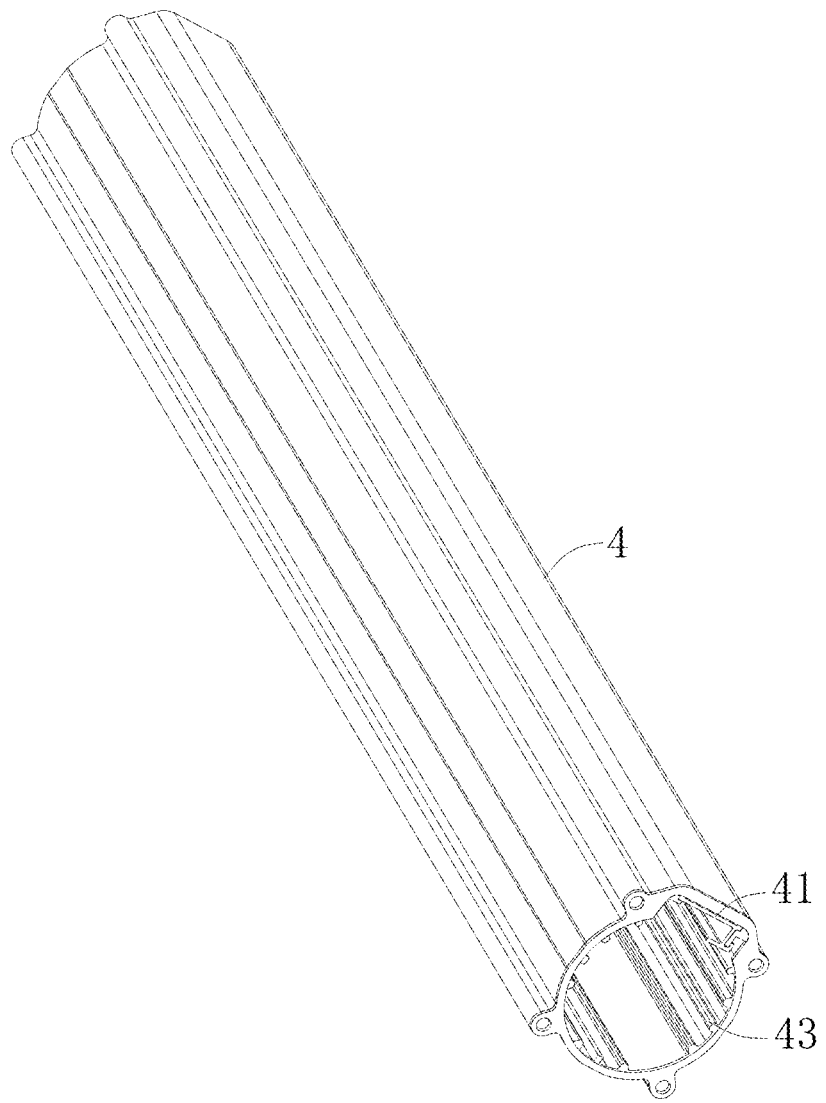
FIG. 12 is a three-dimensional assembled enlarged view of the outer tube and the fixing frame according to the present invention.

Referring to FIG. 12, further, an inner wall of the outer tube body 4 is protruded with a plurality of sliding teeth 43 at intervals; the sliding nut includes a sliding contact assembly and a sliding sleeve 1, where an inner wall of the sliding contact assembly is provided with internal threads, one end of the sliding contact assembly is provided with external threads, the sliding sleeve 1 is sleeved at the other end of the sliding contact assembly, an outer wall of the sliding sleeve 1 is provided with a plurality of chutes 11, each of the chutes 11 is arranged in an axial direction of the sliding sleeve 1, and the plurality of sliding teeth 43 of the outer tube are matched with the plurality of chutes 11 on the sliding sleeve 1 in one-to-one correspondence.

The outer tube body 4 is in a shape of a long tube, and an inner wall of the outer tube body 4 is protruded with a plurality of sliding teeth 43 at intervals. When the entire sliding nut slides in the outer tube, the plurality of sliding teeth 43 of the outer tube body 4 are matched with the plurality of chutes 11 on the sliding sleeve 1 in one-to-one correspondence, so that the inner tube 6 slides more smoothly relative to the outer tube body 4.

Further, an oil seal fitting slot 96 is provided at the back of the fixed end cap 9 at a position corresponding to the outlet, where the single-lip oil seal 90 is sealed and fitted in the oil seal fitting slot 96 by means of a sealing ring 94, and a surface of the oil seal fitting slot 96 is covered with a sealing cover 95. In the present specific embodiment, the single-lip oil seal 90 being sealed and fitted in the oil seal fitting slot 96 by means of the sealing ring 94 can further improve the sealing performance thereof, and can prevent the single-lip oil seal 90 from displacement, so that the surface of the oil seal fitting slot 96 is covered with a sealing cover 95.

Further, the sliding teeth 43 of the outer tube body 4 are tightly attached to outer rings of the first anti-swing ring 91, the piston oil seal 93 and the second anti-swing ring 92.

The sliding teeth 43 of the outer tube body 4 are tightly attached to outer rings of the first anti-swing ring 91, the piston oil seal 93 and the second anti-swing ring 92, a seat processing part is supported at a front end, and the first anti-swing ring 91 and the second anti-swing ring 92 have no die-casting draft angle, so that the first anti-swing ring 91 and the second anti-swing ring 92 are more compactly attached to the inner wall of the outer tube, the support force and concentricity are better, and the inner tube swings less.

Figure 6:
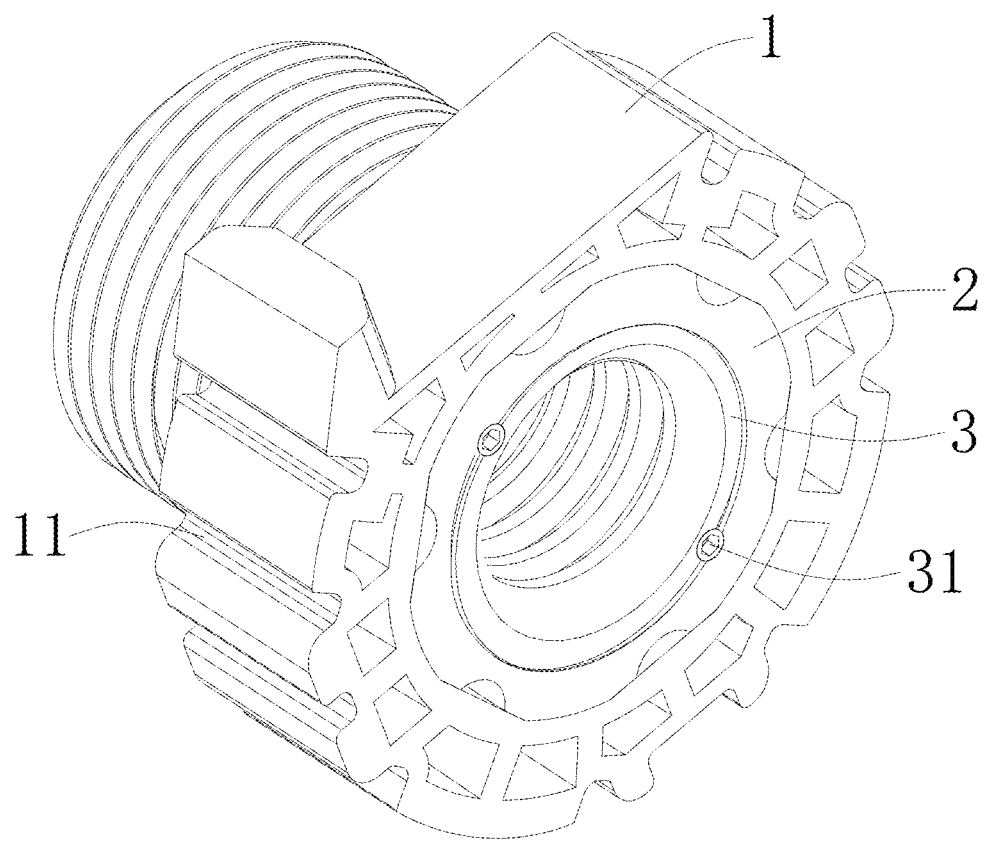
FIG. 6 is a schematic three-dimensional structure diagram of the sliding nut according to the present invention.
Figure 7:
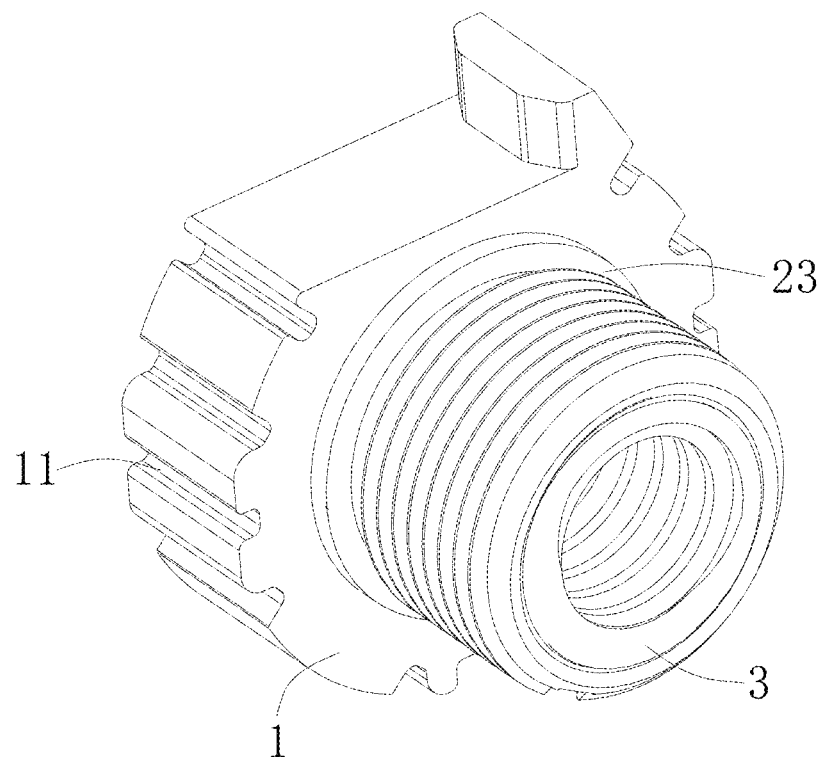
FIG. 7 is a schematic three-dimensional structure diagram from another perspective of the sliding nut according to the present invention.
Figure 8:
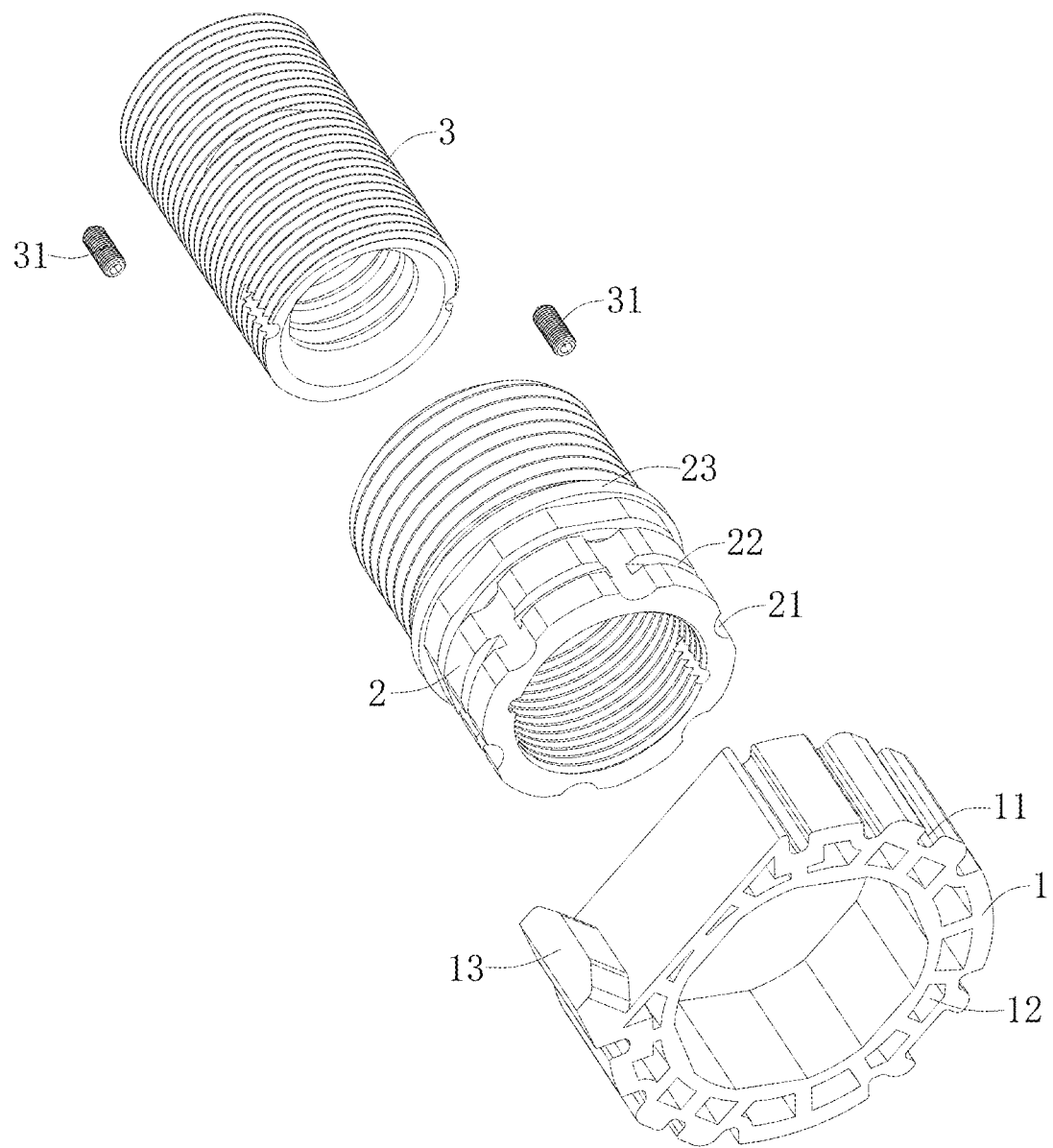
FIG. 8 is a schematic three-dimensional structure diagram of three-dimensional exploding of the sliding nut according to the present invention.
Figure 9:
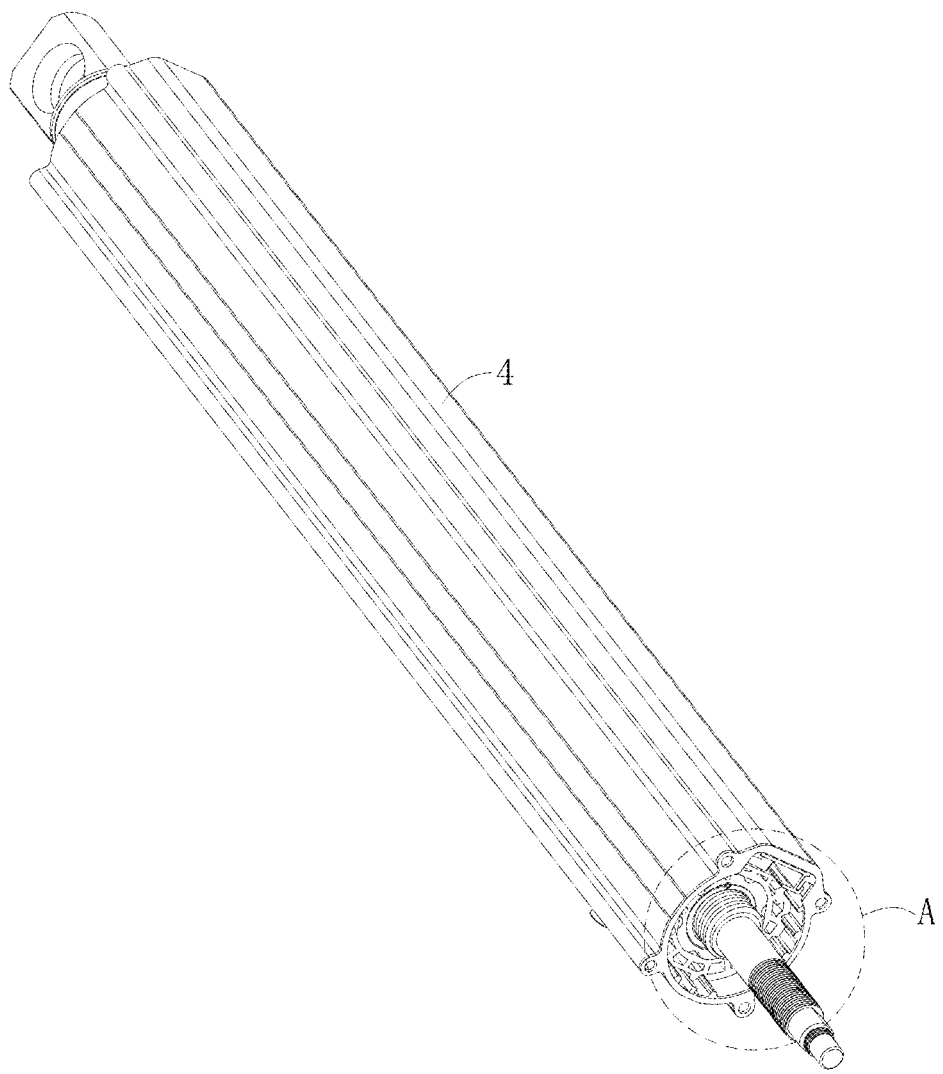
FIG. 9 is a schematic three-dimensional structure diagram after omitting the driving module according to the present invention.
Figure 10:
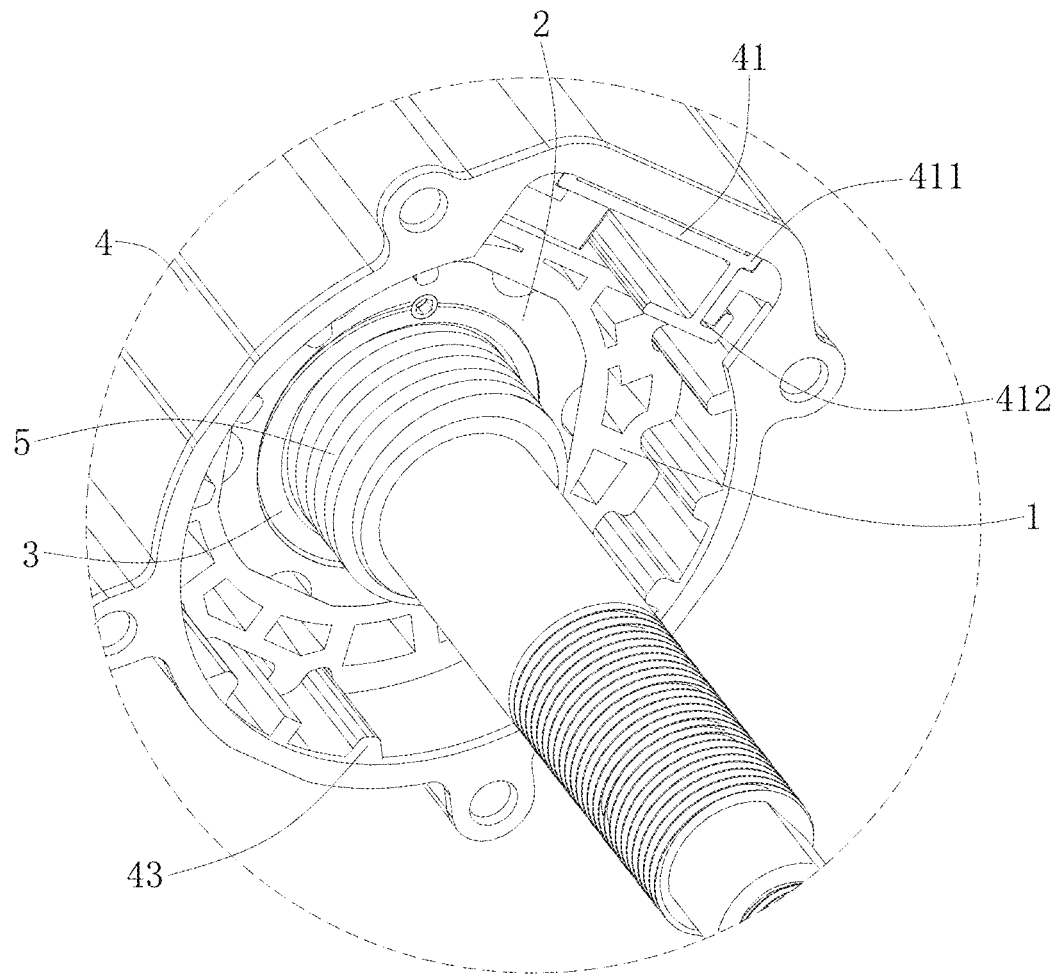
FIG. 10 is an enlarged view of A in FIG. 9.
Figure 11:
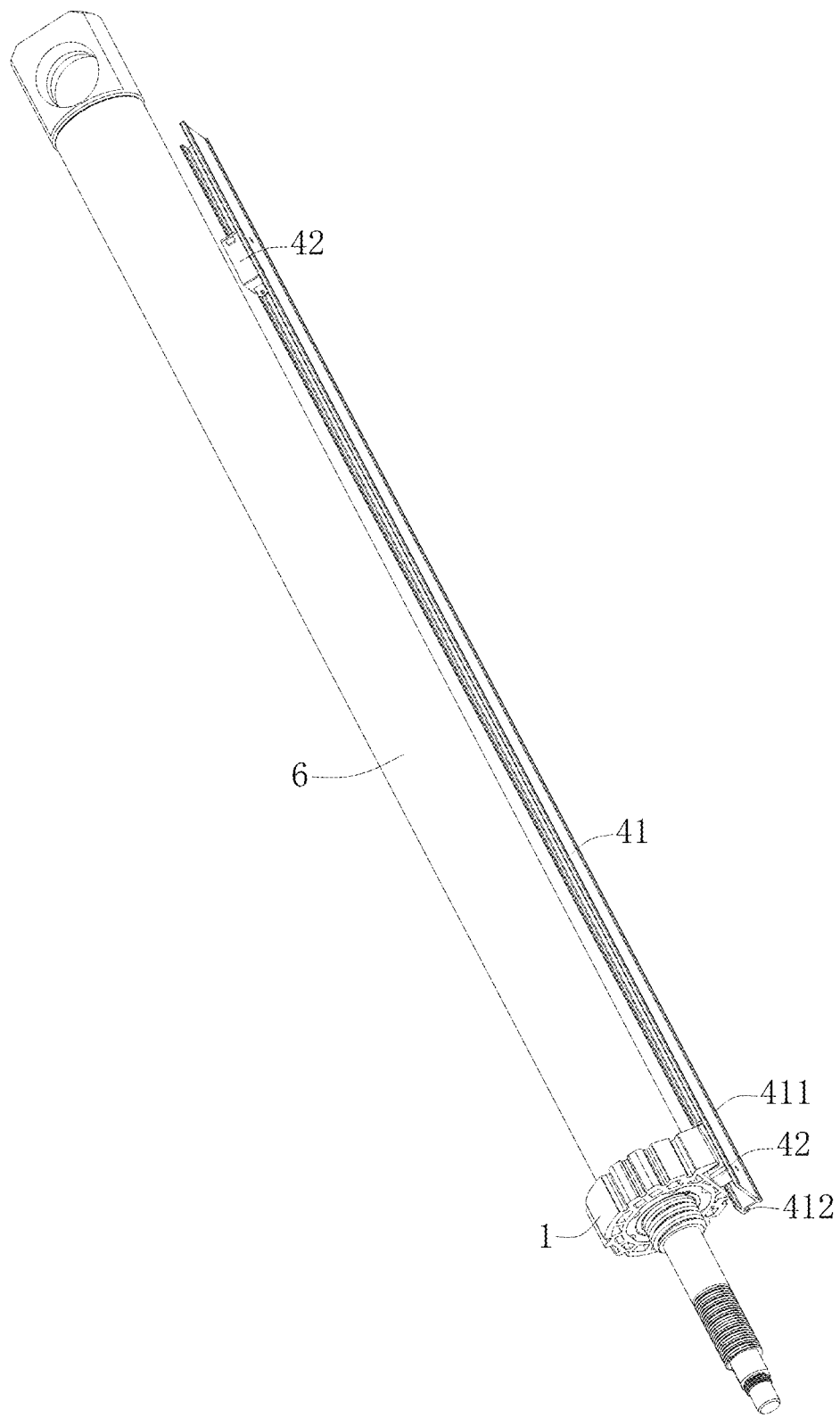
FIG. 11 is a three-dimensional enlarged view of the telescopic rod after removing the outer tube body and the waterproof and dustproof module according to the present invention.

Referring to FIG. 6 to FIG. 8, further, the sliding contact assembly includes a slider 2 and a threaded sleeve 3, where both the slider 2 and the sliding sleeve 1 are annular, the internal threads are arranged on an inner wall of the threaded sleeve 3, the slider 2 is sleeved outside the threaded sleeve 3, the slider 2 and the threaded sleeve 3 are positioned by means of two positioning screws 31, the two positioning screws 31 are arranged between the slider 2 and the threaded sleeve 3 in the axial direction, one part of the same positioning screw 31 is located on an inner wall slot of the slider 2, the other part of the positioning screw 31 is located on an outer wall slot of the threaded sleeve 3, and the two positioning screws 31 are located on end faces of both the slider 2 and the threaded sleeve 3 and are arranged opposite to each other.

The sliding contact assembly includes a slider 2 and a threaded sleeve 3, where both the slider 2 and the sliding sleeve 1 are annular, the internal threads are arranged on an inner wall of the threaded sleeve 3, and the slider 2 is sleeved outside the threaded sleeve 3. In the present embodiment, an outer wall of the threaded sleeve 3 and an inner wall of the slider 2 are connected by means of threads, so that the slider 2 and the threaded sleeve 3 act together. In order to prevent the threaded sleeve 3 from rotating relative to the slider 2, the slider 2 and the threaded sleeve 3 are positioned by means of two positioning screws 31. The two positioning screws 31 are arranged between the slider 2 and the threaded sleeve 3 in the axial direction, one part of the same positioning screw 31 is located on an inner wall slot of the slider 2, the other part of the positioning screw 31 is located on an outer wall slot of the threaded sleeve 3, and the two positioning screws 31 are located on end faces of both the slider 2 and the threaded sleeve 3 and are arranged opposite to each other.

Further, the external threads are located on an outer wall of the slider 2, a plurality of side slots 21, a plurality of grooves 22 and an annular limit table 23 are arranged on an outer wall of one end of the slider 2 away from its external threads, the plurality of side slots 21 extend in an axial direction of the slider 2, the plurality of grooves 22 extend in a circumferential direction of the slider 2, the plurality of side slots 21 are in cross communication with the plurality of grooves 22, and the limit table 23 is located between the plurality of grooves 22 and the external threads.

Referring to FIG. 8, further, the inner wall of the sliding sleeve 1 is matched with the outer wall of the slider 2 in a rotational limit manner, the outer wall of the sliding sleeve 1 is extended outwardly with a limit portion 13, an end face of the sliding sleeve 1 is provided with a plurality of material digging holes 12, and when the sliding sleeve 1 is sleeved on the slider 2, the external threads on the slider 2 and the limit table 23 are located outside the sliding sleeve 1.

Referring to FIG. 9 to FIG. 12, further, the inner wall of the outer tube body 4 is also provided with two hanging slots and a positioning portion, the plurality of sliding teeth 43, the two hanging slots and the positioning portion are all arranged in an axial direction of the outer tube body 4, a fixing frame 41 is hung on the inner wall of the outer tube body 4 in its axial direction, both ends of the fixing frame 41 are provided with elongated hanging tables 411, respectively, the two hanging tables 411 are matched with the two hanging slots of the outer tube body 4 in one-to-one correspondence, respectively, one end of the fixing frame 41 away from the outer tube body 4 is provided with a positioning slot 412 that is matched with the positioning portion of the outer tube body 4, both ends of the fixing frame 41 are fixed with micro switches 42, respectively, the sliding sleeve 1 is located between the two micro switches 42, and the limit portion 13 of the sliding sleeve 1 is located on the side of the fixing frame 41.

The entire sliding nut can slide between the two micro switches 42. When the limit portion 13 of the sliding sleeve 1 touches one of the micro switches 42, an internal circuit board controls a motor 7 to stop working, so that positions of the two micro switches 42 determine upper and lower limit values for upper and lower movement of the inner tube 6.

The lead screw 5 passes through the threaded sleeve 3 in a threading manner, that is, the outer wall of the lead screw 5 is in threaded connection with the threaded sleeve 3, and one end of the inner tube 6 close to the nut is sleeved on the external thread of the slider 2 and presses against the limit table 23 thereof, so that the inner tube 6 and the slider 2 are fixedly connected by means of threads.

In the present specific embodiment, the driving module includes a motor 7, where an output end of the motor 7 is provided with a driving gear 71, the lead screw 5 of the telescopic rod is provided with a driven gear 51, the driving gear 71 is meshed with the driven gear 51 by means of a plurality of transmission gears, and the driving gear 71, the transmission gears and the driven gear 51 are all located inside a base 8.

The above-mentioned embodiments are merely to describe the preferred embodiments of the present invention, and are not intended to limit the scope of the present invention. Without departing from the design spirit of the present invention, various modifications and improvements made to the technical solutions of the present invention by ordinary engineers and technicians in the art should all fall within the scope of protection determined by the claims of the present invention.

What is claimed is:

1. A waterproof and dustproof electric push rod, comprising a driving module, an outer tube assembly, an inner tube, a lead screw and a sliding nut, wherein both the lead screw and the inner tube are located inside the outer tube assembly, the sliding nut is movably fitted on the lead screw, the driving module is connected to the lead screw in a driving manner, and the inner tube is sleeved on a limit nut and extends to the outside of the outer tube assembly or retracts into the outer tube assembly in a length direction of the lead screw; a waterproof and dustproof module is clamped between the inner tube and the outer tube assembly, wherein the waterproof and dustproof module comprises a single-lip oil seal, a first anti-swing ring, a piston oil seal and a second anti-swing ring, which are arranged in sequence in a retraction direction of the inner tube, and inner rings of the single-lip oil seal, the first anti-swing ring, the piston oil seal and the second anti-swing ring are attached to an outer sidewall of the inner tube;

wherein the outer tube assembly comprises an outer tube body and a fixed end cap, wherein a front end of the outer tube body is provided with an opening, the opening is closed by the fixed end cap, and an outlet for the inner tube to pass through is arranged at the center of the fixed end cap;

wherein an inner wall of the outer tube body is protruded with a plurality of sliding teeth at intervals; the sliding nut comprises a sliding contact assembly and a sliding sleeve, wherein an inner wall of the sliding contact assembly is provided with internal threads, one end of the sliding contact assembly is provided with external threads, the sliding sleeve is sleeved on the other end of the sliding contact assembly, an outer wall of the sliding sleeve is provided with a plurality of chutes, each of the chutes is arranged in an axial direction of the sliding sleeve, and the plurality of sliding teeth of the outer tube body are matched with the plurality of chutes on the sliding sleeve in one-to-one correspondence;

wherein the sliding contact assembly comprises a slider and a threaded sleeve, wherein both the slider and the sliding sleeve are annular, the internal threads are arranged on an inner wall of the threaded sleeve, the slider is sleeved outside the threaded sleeve, the slider and the threaded sleeve are positioned by means of two positioning screws, the two positioning screws are arranged between the slider and the threaded sleeve in a radial direction, one part of the same positioning screw is located on an inner wall slot of the slider, the other part of the positioning screw is located on an outer wall slot of the threaded sleeve, and the two positioning screws are located on end faces of both the slider and the threaded sleeve and are arranged opposite to each other.

2. The waterproof and dustproof electric push rod of claim 1, wherein inner sidewalls of the first anti-swing ring and the second anti-swing ring are provided with a plurality of turns of threaded oil storage tanks, and an oil storage chamber is formed between the threaded oil storage tanks and an outer sidewall of the inner tube.

3. The waterproof and dustproof electric push rod of claim 1, wherein an oil seal fitting slot is provided at the back of the fixed end cap at a position corresponding to the outlet, wherein the single-lip oil seal is sealed and fitted in the oil seal fitting slot by means of a sealing ring, and a surface of the oil seal fitting slot is covered with a sealing cover.

4. The waterproof and dustproof electric push rod of claim 3, wherein the sliding teeth of the outer tube body are attached to outer rings of the first anti-swing ring, the piston oil seal and the second anti-swing ring.

5. The waterproof and dustproof electric push rod of claim 1, wherein the external threads are located on an outer wall of the slider, a plurality of side slots, a plurality of grooves and an annular limit table are arranged on an outer wall of one end of the slider away from its external threads, the plurality of side slots extend in an axial direction of the slider, the plurality of grooves extend in a circumferential direction of the slider, the plurality of side slots are in cross communication with the plurality of grooves, and the limit table is located between the plurality of grooves and the external threads.

6. The waterproof and dustproof electric push rod of claim 1, wherein the inner wall of the sliding sleeve is matched with the outer wall of the slider in a rotational limit manner, the outer wall of the sliding sleeve is extended outwardly with a limit portion, an end face of the sliding sleeve is provided with a plurality of material digging holes, and when the sliding sleeve is sleeved on the slider, the external threads on the slider and the limit table are located outside the sliding sleeve.

* * * * *